Sept. 2, 1952      N. L. HEIKES      2,609,146
MIXING VALVE

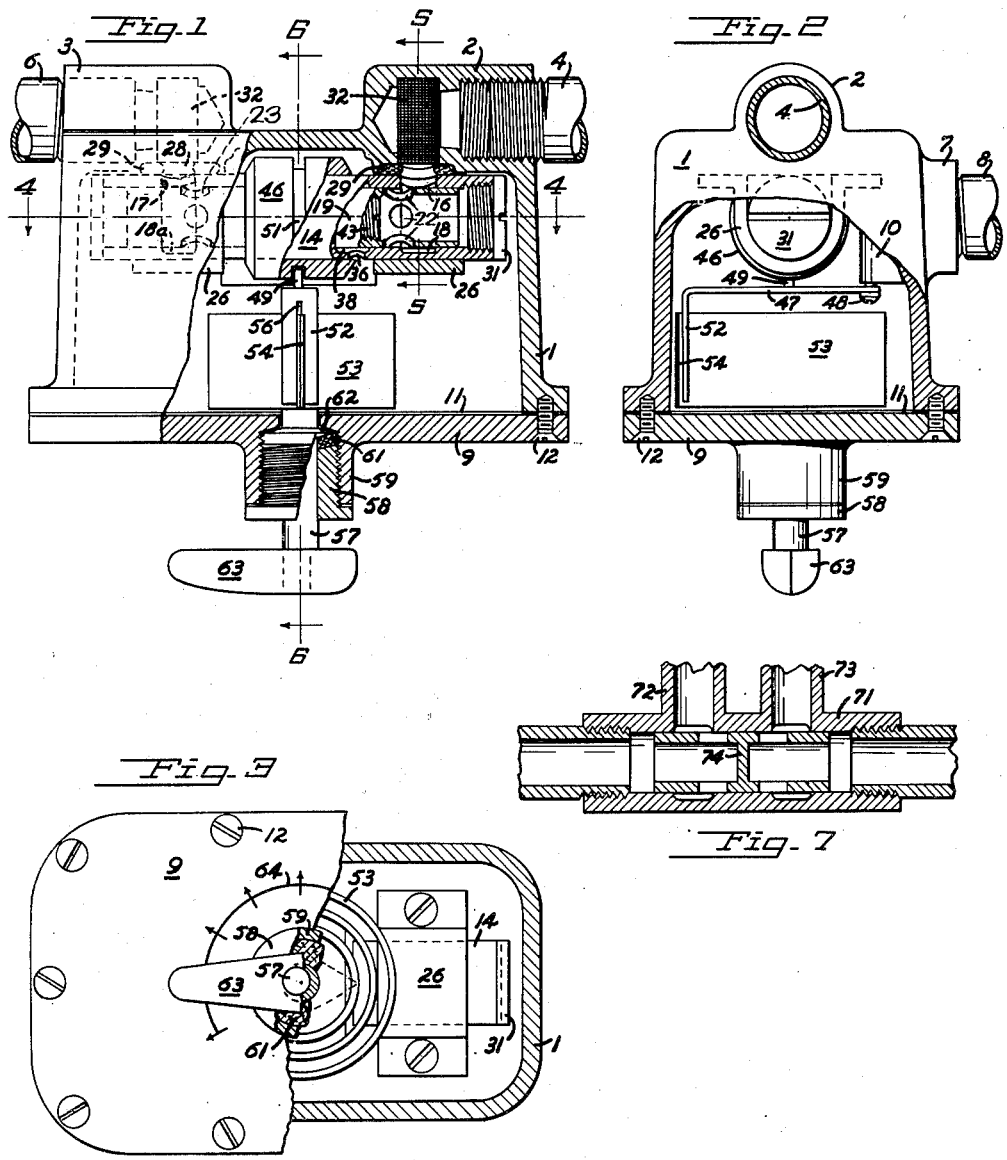

Filed Nov. 28, 1947      2 SHEETS—SHEET 2

INVENTOR.
NORMAN L. HEIKES
BY Charles S. Evans
his ATTORNEY

Patented Sept. 2, 1952

2,609,146

UNITED STATES PATENT OFFICE 2,609,146

MIXING VALVE

Norman L. Heikes, San Pablo, Calif., assignor to W. Kenneth Rosenberry, Oakland, Calif., doing business as Berkeley Scientific Company, Richmond, Calif.

Application November 28, 1947, Serial No. 788,343

3 Claims. (Cl. 236—12)

My invention relates to mechanism for equalizing the delivery pressure of liquids supplied from separate sources; and also for mixing such liquids and controlling the temperature of the mixture.

It is among the objects of my invention to provide a fitting by which the delivery pressures of liquids supplied separately from different sources under variable pressures are automatically equalized, regardless of variations of pressure at any source.

Another object of my invention is to provide mechanism for automatically regulating the supply of liquids from different sources supplied at varying temperatures for automatically maintaining a predetermined temperature of the mixture at a point of common delivery.

Another object is to provide a mixing device by which water or other liquids supplied from separate sources under variable conditions of pressure and temperature may be automatically regulated to maintain a predetermined temperature of mixed liquid at a point of delivery regardless of variations in pressure and/or temperature at any source.

Another object is to provide a pressure and temperature regulating device for water mixers embodying improved features of construction and operation, and which may be easily installed with standard fittings in conventional installations.

The invention possesses other objects, some of which with the foregoing will be set forth at length in the following description wherein are explained those forms of the invention which have been selected for illustration in the drawings accompanying and forming a part of this specification. In said drawings, illustrative forms of the invention are shown, but it is to be understood that it is not limited to those forms, since the invention as set forth in the claims may be embodied in a plurality of other forms.

In the drawings:

Figure 1 is a plan view of the control mechanism of my invention, parts being broken away and shown in section.

Figure 2 is an end elevation of the device of Figure 1, parts being broken away and shown in section.

Figure 3 is a front elevation of the device of Figure 1, parts being broken away and shown in section.

Figure 7 is a longitudinal mid-sectional view of the pressure equalizing mechanism for use independently of temperature control.

Figure 4:
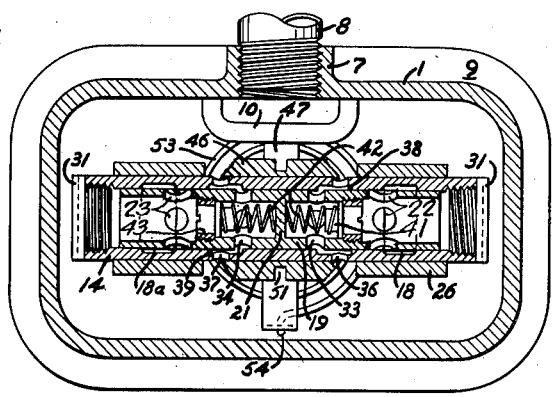
Figure 4 is a vertical sectional view, the plane of the section being indicated by the line 4—4 of Figure 1.
Figure 5:
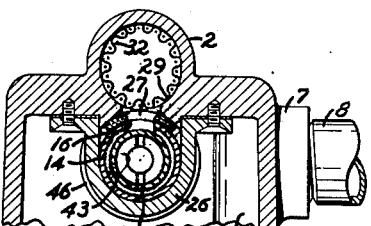
Figure 5 is a fragmental sectional view, the plane of the section being indicated by the line 5—5 of Figure 1.
Figure 6:
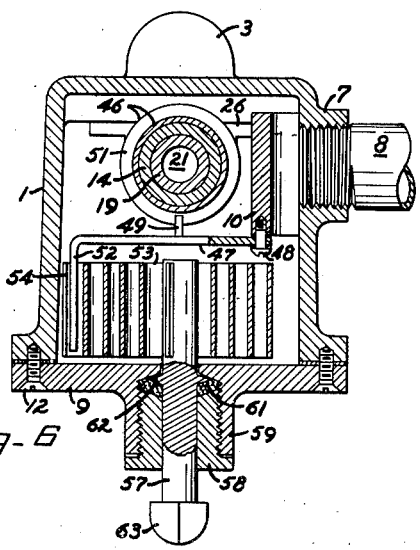
Figure 6 is a sectional view of the device, the plane of the section being indicated by the line 6—6 of Figure 1.

In terms of broad inclusion, the device of my invention comprises a liquid delivery tube connected to two different sources of liquid supply separately deliverable through the tube at spaced outlets. Pressure responsive means, for example a floating piston movable within the tube to cover and uncover the inlet ports to varying degrees, automatically equalizes the pressures at which the two liquids are maintained within the control tube. Where equalized pressures only are required, the spaced outlets may be positioned at any convenient locations and may be independently connected to desired delivery points for mixed or unmixed delivery of the liquids.

Where it is desired to control the temperature as well as the pressure of the outgoing liquids the outlets of the control tube are connected to a mixing chamber and are spaced in a manner such that they may be covered and uncovered to varying degrees by a valve movable by temperature responsive means, such as a thermostat, for automatically maintaining a predetermined temperature of the mixed liquids within the chamber. Manually operable means are provided for adjusting the thermostat to respond to temperature changes above and below a selected degree, whereby the mixed liquids may be maintained at a desired delivery temperature.

In terms of greater detail, and in its preferred embodiment, the device of my invention comprises a housing 1 forming a mixing chamber provided with spaced inlets 2 and 3 having connections 4 and 6 respectively to separate sources of supply of water or other liquid; and also provided with a delivery outlet 7 to which a delivery connection 8 is connected. The housing is preferably a metal casting having one open face over which may be secured a cover 9 seating upon a gasket 11 and secured to the housing by suitable securing means such as screws 12. The connections 4, 6 and 8 may be ordinary pipe threaded into the inlets and outlets. A baffle 10 is positioned within the mixing chamber over the outlet 7 to insure effective mixing of liquids before leaving the chamber.

The pressure equalizing portion of my device comprises a control tube or cylinder 14 having spaced inlet ports 16 and 17 opening into annular channels 18 and 18a cut interiorly of the tube 14 and forming inlet passages. A piston 19 is closely fitted for sliding movement within the cylinder 14. The piston 19 has hollow ends and is provided with a substantially central partition 21 positioned between the inlet ports 16 and 17. The hollow end portions of the piston extend axially in opposite directions from the partition and are provided with ports 22 and 23 positioned to register with the ports 16 and 17, and/or the channels 18, 18a into which said ports open, to varying degrees ranging from substantially full opening of the ports at one or the other side of the piston partition 21 and substantially complete closure of the ports upon the opposite side of the piston partition.

The piston 19 is mounted for free axial movement within the cylinder 14; and the ports 22 and 23 are arranged to overlap the ports 16 and 17 and connecting channels 18 and 18a to varying degrees. The effective pressure within the cylinder from each source of fluid supply is controlled by the degree of registry of the ports 22 and 23 with the channels 18 and 18a and ports 16 and 17. Pressure from the source supplying liquid upon one side of the piston is opposed by the pressure of the source supplying liquid to the cylinder through the inlet ports upon the opposite side of the piston partition. Any change in pressure upon either side of the piston results in a movement, impelled by the excess pressure upon the high pressure side, such as to decrease the opening of the inlet port on the high pressure side and increase the opening of the inlet port upon the low pressure side until equilibrium is restored.

In the preferred embodiment illustrated in the drawings, the pressure equalizing means is mounted within the mixing chamber by means of clamps 26 securing the tube 14 in a normal seated position with the ports 16 and 17 communicating with the inlets 2 and 3 through ports 27 and 28. Gaskets 29 provide seats for the tube 14 sealing the connection between the ports 16 and 17 and the corresponding inlet ports 27 and 28. The ends of the tube 14 are closed by plugs 31. Cylindrical screens 32 are preferably mounted in the inlets 2 and 3 over the ports 27 and 28.

The piston 19 is provided with ports 33 and 34 movable to register in varying degrees with delivery ports 36 and 37 in the wall of the tube 14. Preferably a plurality of the ports 33 and 34 are provided in circumferentially spaced relation to register with internal circumferential channel grooves 38 and 39 communicating with the delivery ports 36 and 37. The axial position of the ports 33 and 34 relative to the grooves 38 and 39 is such as to permit liquid to flow from each side of the piston through the corresponding delivery ports 36 and 37 into the mixing chamber regardless of the position of the piston between its normal limits.

Check valves 41 are mounted within the piston 19 upon opposite sides of the partition 21 between the ports 22 and the ports 33 at one side and the ports 23 and 34 at the other side. The valves 41 are spring loaded by means of springs 42 seated against collars 43 threaded or otherwise secured within the piston. The check valves are displaced against the pressure of the springs 42 by normal delivery pressure of liquid supplied to the piston through the inlet ports 22 and 23, so that liquid may be delivered through the ports 33, 34, 36 and 37 to the mixing chamber. The check valves prevent the transmission of pressure from the mixing chamber back into the equalizer tube, thus preventing a false equalizing of pressures upon opposite sides of the piston such as might otherwise result from the mixing of the liquids in the mixing chamber.

Thermostatic means are provided for regulating the mean temperature of the mixed liquids supplied through the inlet connections. Said means comprises a sleeve 46 slidably mounted upon the tube 14 between the ports 36 and 37, and movable as a valve to open and close said ports to oppositely varying degrees ranging from substantially complete closure to substantially complete opening.

The valve sleeve 46 is actuated by a lever 47 pivoted upon a pivot screw 48, mounted upon the baffle 10. The lever is provided with a pin 49 engaging an annular groove 51 in the outer surface of the sleeve. The lever 47 is provided with an arm 52 to which the outer end of a bimetallic strip, preferably spirally wound to form a thermostat coil 53, is connected. A lip 54 bent secures the coil to the arm.

The inner end of the thermostat coil 53 is secured to a shaft 57 extending into the mixing chamber. Preferably the shaft 57 is journalled upon the cover plate 9 in a bearing block 58 threaded into a recessed lug 59 upon the cover plate 9. The block 58 and lug 59 also cooperate as a packing gland for the shaft, the inner end of the block serving to press a packing ring 61 against a flange 62 carried by the shaft within the back of the recessed lug. The flange 62 prevents axial movement of the shaft, and the packing ring 61 prevents leakage of liquid from the mixing chamber past the shaft. A handle 63 is secured upon the outer end of the shaft 57.

The shaft 57 and thermostat coil 53 are mounted upon the cover plate as an assembly unit. As the cover is placed over the open face of the housing, the lip 54 of the coil slides into interlocking engagement with the slotted lever arm 52, thereby facilitating the assembly of the parts.

The thermostat 53 is so shaped and connected as to engage and hold the lever 47 and the valve sleeve 46 in operative positions within the normal range of movement thereof. The position of the sleeve 46 along the tube 14, relative to the ports 36 and 37, may be adjusted by means of the handle 63 and shaft 57. By turning the handle to a selected point, the sleeve may be moved to obtain a predetermined degree of opening of each of the ports 36 and 37 and a fixed ratio of the flow of liquid therethrough. Preferably a scale 64 is provided on the face of the cover plate 9, readable in association with the handle, for indicating the approximate position of the sleeve. Where the sources of liquid are normally maintained at a known and more or less constant temperature, the scale 64 may be calibrated in terms of temperature. In such cases, an initial setting of the handle to a selected position will position the sleeve 46 at a point proportioning the flow of liquid from the two sources to obtain substantially the desired temperature of the outgoing mixed liquids.

In operation, the device is connected in conventional manner into a liquid supply system, such for example as the hot and cold water supply connections to a shower bath or other delivery fixture. In such a system, the cold water supply is connected to the inlet 2, and the hot water supply to the inlet 3. The outlet connection 8 is connected to the delivery fixture through a suitable delivery control valve, not illustrated, by which the flow can be regulated.

The handle 63 is set in a position corresponding to a desired delivery temperature, and the delivery control valve is opened to permit flow at a desired rate. The pressures at which the liquids from the two supplies are delivered are automatically equalized by the operation of the piston 19 within the tube 14.

The liquids from the two supplies pass the check valves 41, and thence flow into the mixing chamber through the ports 33 and 34, the connecting channel grooves 38 and 39, and the delivery ports 36 and 37. The rate of flow of hot and cold water into the mixing chamber is proportioned in a fixed ratio corresponding to the initial setting of the handle 63, and the mixture is delivered through the outlet connection 8 at corresponding temperature.

In event the temperature of the hot water supply is reduced, the mixture will become correspondingly cooler. As the temperature of the mixture is reduced, the thermostat coil 53 will contract and thereby move the lever 47 and valve sleeve 46 to the right, as viewed in Figure 1 of the drawings. This movement will decrease the flow of cold water from the cold inlet 2 and increase the flow of hot water from the hot inlet 3 sufficiently to cause the mean temperature of the mixture to be restored to the temperature for which the handle was initially set. Should the temperature of the incoming hot water be increased, the resulting increase in the temperature of the mixture causes the coil 53 to expand. In that case, the sleeve 46 is moved to the left to maintain the set temperature by reducing the hot water supply and increasing the cold water supply.

In case the water within the mixing chamber is cold when the handle 63 is set for a selected delivery temperature, the thermostat will be placed under tension such as to move the sleeve 46 to substantially fully close the cold water port 36 until such time as the entry of hot water raises the temperature within the mixing chamber up to the degree required for opening the port 36 sufficiently to obtain the desired temperature of mixture.

The temperature and pressure controls cooperate to insure delivery of the mixed liquids under constant conditions of temperature and pressure regardless of changes in either temperature or pressure, or both. Slow changes in temperature, such as may result from heating of the supply pipes, or exhausting of the hot water supply, are automatically compensated for, within the limits of the supply temperatures, by the thermostatically controlled valve 46. Rapid changes, such as may occur when the flow of water is turned on or off at some other outlet in the same system, are instantly compensated for by the pressure equalizing piston.

While the pressure equalizing means of my invention is primarily useful in a mixing device where temperature is also a factor to be controlled, it may be used in systems where control of the delivery pressure only is required. In such a system, liquid from two different sources may be introduced into a control tube 71 through supply connections 72 and 73 upon opposite sides of a piston 74 movable in response to differences in pressure upon opposite sides of the piston, as in the case of the tube 14 and piston 19 above described. The delivery connections may be arranged at any point upon opposite ends of the tube, as for example in the manner illustrated in Figure 7.

I claim:

1. A device for mixing and delivering liquids under controlled conditions of temperature and pressure comprising, a housing provided with spaced inlets for supplying liquids from different sources of supply and an outlet for the mixed liquids, a cylinder mounted within the housing, said cylinder being provided with spaced inlets communicating with the housing inlets and spaced outlets opening into the housing, a piston within the cylinder movable in response to variations in pressures of the liquid supply to cover and uncover the inlets to varying degrees for equalizing the pressures of the liquids within the cylinder, a sleeve mounted upon the cylinder and movable thereon to open and close the outlets to varying degrees, and temperature responsive means for actuating the sleeve to maintain a predetermined mean temperature of the mixed liquids within the mixing chamber.

2. In a valve for equalizing the pressures of separate streams of hot and cold water and delivering the equalized streams separately into a mixing chamber, a housing constituting the mixing chamber, a cylinder closed at its opposite ends and fixed in the housing, separate passages for the hot and cold streams in the housing and cylinder and opening respectively in opposite ends of the cylinder, a hollow piston open at each end and having a central transverse partition and slidably disposed in the cylinder, inlet ports in said piston wall on each side of the partition and spaced whereby in central position of the piston, each inlet port is half open into an annular recess and half closed by the cylinder wall, a delivery passage through the piston and cylinder on each side of the partition and opening into the mixing chamber in a delivery port, a sleeve valve slidably disposed about the cylinder and arranged whereby in central position each delivery port is half closed and half open, and temperature responsive means disposed in the mixing chamber for actuating the sleeve valve to proportion the flow from each delivery port.

3. In a valve for equalizing the pressures of separate streams of hot and cold water and delivering the equalized streams separately into a mixing chamber, a housing constituting the mixing chamber, a cylinder closed at its opposite ends and fixed in the housing, separate passages for the hot and cold streams in the housing and cylinder and opening respectively in opposite ends of the cylinder, a hollow piston open at each end and having a central transverse partition and slidably disposed in the cylinder, inlet ports in said piston wall on each side of the partition and spaced whereby in central position of the piston, each inlet port is half open into an annular recess and half closed by the cylinder wall, a delivery passage through the piston and cylinder on each side of the partition and opening into the mixing chamber in a delivery port, a check valve allowing flow only toward the delivery passage and arranged on each side of the partition between the inlet port and the delivery passage, a sleeve valve slidably disposed about the cylinder and arranged whereby in central position each delivery port is half closed and half open, and temperature responsive means disposed in the mixing chamber for actuating the sleeve valve to proportion the flow from each delivery port.

NORMAN L. HEIKES.

(References on following page)

REFERENCES CITED

The following references are of record in the file of this patent:

UNITED STATES PATENTS

| Number | Name | Date |
|---|---|---|
| 990,557 | Holman | Apr. 25, 1911 |
| 1,807,040 | Leonard | May 26, 1931 |
| 1,948,044 | Myers | Feb. 20, 1934 |
| 2,145,114 | Gibbs | Jan. 24, 1939 |
| 2,172,489 | Young | Sept. 12, 1939 |
| 2,175,203 | Leonard | Oct. 10, 1939 |
| 2,200,578 | Mahon | May 14, 1940 |
| 2,250,815 | Ruegg et al. | July 29, 1941 |
| 2,413,896 | Trautman et al. | Jan. 7, 1947 |
| 2,423,264 | Stephens | July 1, 1947 |